Jan. 4, 1938.  M. F. BETZOLD ET AL  2,104,218
THERMOMETER
Filed Feb. 18, 1936
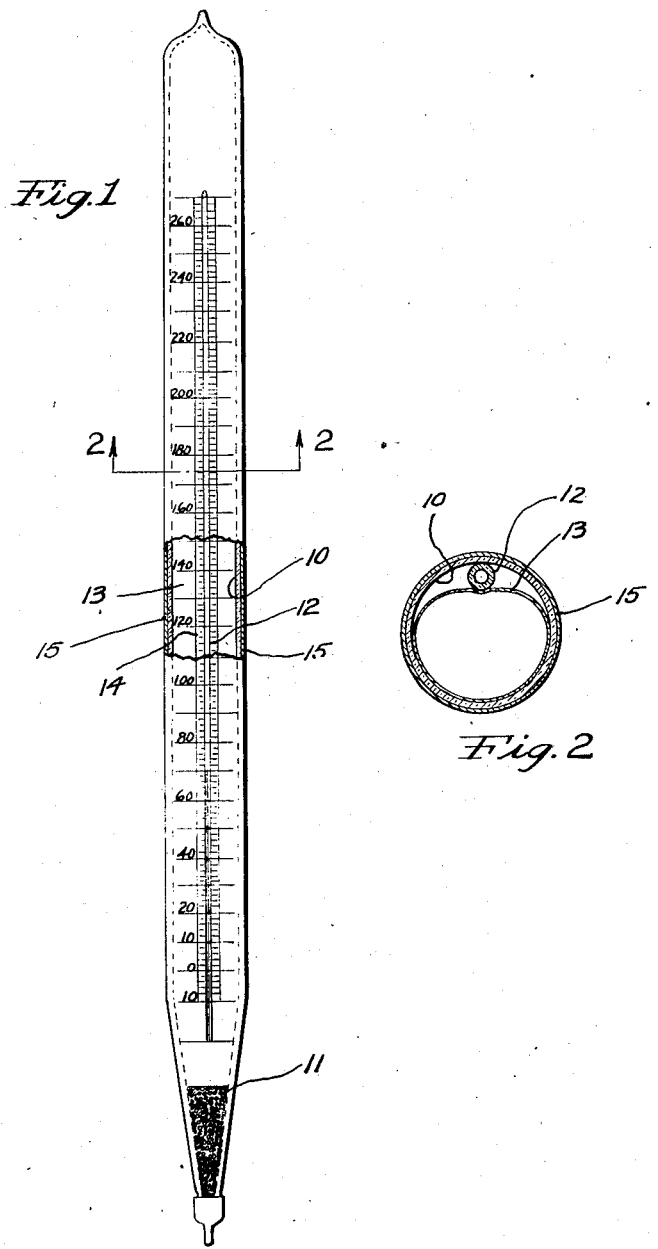
Inventor
Max F. Betzold
Charles Rascher
and Charles A. Torp
By P. John Truscott
Attorney Patented Jan. 4, 1938

2,104,218

UNITED STATES PATENT OFFICE 2,104,218

THERMOMETER

Max F. Betzold, Charles Rascher, and Charles A. Torp, Chicago, Ill., assignors to Rascher & Betzold, Inc., Chicago, Ill., a corporation of Illinois Application February 18, 1936, Serial No. 64,479

2 Claims. (Cl. 73—374)

The present invention relates to thermometers and, particularly, that type of thermometer used to measure the temperature of a liquid, the liquid, which may be of either low or high viscosity, supporting the thermometer, which is of the floating type provided with a weighted lower end to keep it in a somewhat vertical position in the liquid. Such thermometers are particularly useful in the manufacture of dairy products, especially cheese.

Since thermometers are generally made out of glass and are, therefore, quite readily broken, it is obvious that if the thermometer is broken, fragments of glass may fall into the liquid or become commingled with solids therein, and, of course, a scrupulous dealer will not endanger the life or health of any of his customers by using the product which he is making in which the glass has fallen. The material into which the glass falls would then have to be either filtered or thrown out, either procedure resulting in a great loss to the manufacturer.

Therefore, it is the primary object of our invention to provide a thermometer which will be safe for use in the making of dairy products and the like.

Another object of this invention is to provide on a thermometer a transparent coating for the glass portion or portions thereof whereby when the thermometer is struck the same is not as readily broken, and if broken the fragments of glass cannot fall into the material in which the thermometer has been placed. Sometimes in working with a batch of material of this nature, paddles, etc. are used and these may accidently strike the thermometer if the operator is careless, either in the operation of the paddle or in his failure to remove the thermometer while using the paddle.

Another object of this invention is to provide on a thermometer having glass portions, a transparent coating of a nature which will not liquefy or be in any way materially affected by temperatures within the range for which the thermometer is designed.

A particular object of this invention is to make the transparent coating of a lacquer which completely encloses and closely embraces the glass portions of the thermometer, the lacquer being preferably of a character such that temperatures will not cause the same to become clouded so as to interfere with the proper reading of the thermometer.

Other objects of this invention will appear hereinafter as the description thereof proceeds, the novel features, arrangements and combinations being clearly set forth in the specification and in the claims thereunto appended.

In the drawing:

Fig. 1 is an elevational view of a thermometer embodying my invention with a portion thereof broken away for the sake of clearness, and Fig. 2 is a cross-section taken along the line 2—2 of Fig. 1.

It will be understood that the thermometer shown in the drawing is merely one embodiment of our invention and that the invention is not limited to thermometers used in the making of dairy products or even thermometers used in liquids, but may also be used with any type thermometer and, particularly, those made of glass, for our invention will normally protect the thermometer from breakage due to slight shocks imparted thereto.

The thermometer illustrated comprises a tubular portion 10 closed at the upper and lower ends thereof, the bottom portion being provided with weight material 11 or made with a large mercury bulb heavy enough to weight the thermometer without any additional weighting material to hold the thermometer in a somewhat vertical position when the same is in use, the thermometer being normally buoyed up by the liquid due to the fact that it is hollow. Inside the casing 10 is the usual capillary tube 12 in which there is any suitable indicating medium for indicating the temperature. A tubular piece of paper or the like is placed within the tube in the manner best illustrated in Fig. 2 so that it lies between the rear side of the capillary tube 12 and the opposite inner side of the tube 10. This tubular piece of paper 13 is provided with suitable scale markings, such as 14.

A suitable lacquer in liquid form is then placed in a receptacle and the thermometer is dipped in this lacquer and withdrawn, the lacquer drying on the outside of the tube to form an impervious coating 15 for the tube, which closely embraces the tube and provides a sheath therefor which is not easily broken by slight shocks or blows which might shatter the glass from which the tube 10 is made.

If the thermometer receives a blow just sufficient to shatter the glass, the coating 15 will not be broken and the fragments of glass will be retained within the sheath formed by the coating. It requires a substantially greater force to break the sheath or rupture the same than it does to break the glass and, therefore, except for abnormal blows, it is unlikely that the sheath will be broken, although obviously it is not totally indestructible.

The sheath is preferably made sufficiently thick so that even if whole sections of the tube are shattered and the fragments fall to the bottom of the thermometer, the thermometer will not be unusable thereafter, because the sheath is sufficiently thick to be self-sustaining and bridge the gap in the thermometer. The sheath closely embraces the thermometer tube and acts as a reinforcing and cushion means, therefore the glass itself will not shatter as quickly as it might otherwise.

It will be obvious from the description that if this thermometer becomes broken while in use the same can be removed from the liquid or other material, the temperature of which is being taken, without any injury having been done to the material or if the capillary tube 12 has not been broken or the paper scale 13 displaced the thermometer may be used at least until another unbroken thermometer is procured as, obviously, if the thermometer is broken at all the manufacturer will wish to replace it by a new one. Thus, the manufacturing of the product is not interrupted merely by the breakage of the glass and also there is no waste of material because the product being made does not have to be thrown away.

We have found that a lacquer made up of the following materials in substantially the proportions indicated is satisfactory for the purposes of this invention. It will not cloud and it will not, therefore, destroy the usefulness of the thermometer. In fact, thermometers made according to this invention have been in use for a long period of time without it being apparent even to the user that the same is made of anything but glass, the coating being practically as transparent as the glass itself.

We have found that one suitable lacquer which may be used for this purpose may be made of a cellulose nitrate mixed with a gum such as camphor, a resin, a waterproof plasticizer, and suitable solvents such as amyl acetate, butyl acetate, butanol, toluol, etc., in the proper proportions to produce after application and evaporation a film with sufficient tenacity to withstand breakage under ordinary conditions or use. Such a film does not cloud appreciably when immersed in boiling water at approximately 212° F., which is much beyond the temperatures usually employed in the dairy industry. In appearance, the finished thermometer looks the same as if made entirely of glass.

Any one or combination of the following chemical plasticizers could be used: Tricresyl phosphate, diamyl phthalate, dibutyl phthalate, dibutyl tartrate, triacetin, triphenyl phosphate or tributyl phosphate. Castor oil and camphor can also be used as plasticizers.

The percentage of plasticizer could be from 5 to 50%. Cellulose nitrate can vary from 30 to 70%, and gums and resins might vary from 10 to 60%. The resins that might be used are shellac, damar, ester gum, phenolformaldehyde condensation resins. This is the approximate composition of the film. The solvent is merely used as a diluent, and the percentage is relatively unimportant.

The term "coating material" as used in the claims refers to a material which is applied in the form of liquid or semi-liquid, such as lacquer, which coats the surface and forms a tough layer when dry over that surface to distinguish from a sheath which is slipped over the same in the nature of a container.

Obviously, those skilled in the art to which this invention pertains may make various changes in the invention, construction and arrangement of the parts or the materials thereof without departing from the spirit of this invention and, therefore, we do not wish to be limited except as hereinafter set forth in the claims hereunto appended.

Having thus fully described our invention, what we desire to claim and secure by Letters Patent of the United States is:

1. A thermometer comprising temperature-indicating means, a glass chamber enclosing said temperature-indicating means and a layer of tough transparent coating material over the outer surface of said glass.

2. A thermometer comprising temperature-indicating means, a glass chamber enclosing said temperature-indicating means and a layer of tough transparent coating material over the outer surface of said glass, said material being of a character such that its transparency is not materially affected by the temperatures within the temperature ranges for which the thermometer is designed.

MAX F. BETZOLD.
CHARLES RASCHER.
CHARLES A. TORP.